(12) United States Patent
Saiki

(10) Patent No.: US 6,515,241 B2
(45) Date of Patent: Feb. 4, 2003

(54) POWER SEAT SWITCH APPARATUS FOR VEHICLE

(75) Inventor: Shinichi Saiki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 09/985,681

(22) Filed: Nov. 5, 2001

(65) Prior Publication Data

US 2002/0053501 A1 May 9, 2002

(30) Foreign Application Priority Data

Nov. 9, 2000 (JP) ........................................ 2000-341851

(51) Int. Cl.[7] .............................................. H01H 9/26
(52) U.S. Cl. ...................... 200/5 R; 200/17 R; 200/18; 200/6 R; 200/6 A
(58) Field of Search ............................... 200/5 R, 17 R, 200/18, 6 R, 6 A, 4, 529

(56) References Cited

U.S. PATENT DOCUMENTS

| | | | | |
|---|---|---|---|---|
| 4,454,390 A | * | 6/1984 | Gmeiner et al. | 200/6 A |
| 4,678,872 A | * | 7/1987 | Gutman | 200/5 R |
| 5,128,500 A | * | 7/1992 | Hirschfeld | 200/5 R |
| 5,278,363 A | * | 1/1994 | Krieg et al. | 200/5 R |
| 5,442,149 A | | 8/1995 | Sato | |
| 5,844,182 A | * | 12/1998 | Hirano et al. | 200/5 R |
| 6,040,533 A | * | 3/2000 | Wagner | 200/5 A |
| 6,262,379 B1 | * | 7/2001 | Tajima | 200/5 R |

FOREIGN PATENT DOCUMENTS

| | | |
|---|---|---|
| DE | 196 22 256 A1 | 12/1996 |
| DE | 298 04 361 U1 | 7/1998 |
| EP | 0 530 509 A2 | 7/1992 |

\* cited by examiner

*Primary Examiner*—Elvin Enad
*Assistant Examiner*—Kyung Lee
(74) *Attorney, Agent, or Firm*—Morgan, Lewis & Bockius LLP

(57) ABSTRACT

A seat horizontal movement switching section (16) is operated in a horizontal direction for moving an entire seat in a horizontal direction. A bottom-front vertical movement switching section (17) is operated in a vertical direction for adjusting the bottom-front of a seat (12) in the vertical direction. A bottom-rear vertical movement switching section (18) is operated in the vertical direction for adjusting the bottom-rear of the seat in the vertical direction. An angle adjustment switching section (19) is operated in the horizontal direction for adjusting the angle of a back portion (13). A first knob (20) is capable of making a horizontal operation and a vertical operation to operate said seat horizontal movement switching section 16 and said bottom-front vertical movement switching section (17). A second knob (21) is capable of making the horizontal operation and the vertical operation to operate said bottom-rear vertical movement switching section (18) and said angle adjustment switching section (19).

4 Claims, 7 Drawing Sheets

POWER SEAT SWITCH APPARATUS FOR VEHICLE

BACKGROUND OF THE INVENTION

This invention relates to an improvement of a power seat switch apparatus for a vehicle.

Generally, as shown in FIG. 8, a seat 1 for a vehicle is placed on a base 1a, and is constructed by a bottom 2 and back portion 3. A power seat switch apparatus 4 for changing the form of the seat 1 according to user's preference is attached to the side of the base 1a. The power seat switching apparatus 4 includes a seat horizontal-movement switching portion 5, a bottom-front vertical-movement switching portion 6, a bottom-rear vertical-movement switch portion 7 and an angle adjustment switching portion 8. Incidentally, although not shown, a power section comprising a motor and a working portion is provided for moving the bottom 2 and the back portion 3 in each direction and adjusting their angle so as to correspond to the switching portions 5 to 8, individually.

The seat horizontal-movement switching portion 5, the bottom-front vertical-movement switching portion 6 and the bottom-rear vertical-movement switching portion 6 are operated by a knob 9. Specifically, the knob 9 is movably operated in a horizontal direction (direction of arrow A); its front is movably operated in a vertical direction (direction of arrow B) around the rear end; and its rear is movably operated in a vertical direction (direction of arrow C).

When the knob 9 is operated in the direction of arrow A, an operated member (not shown) for the seat horizontal-movement is operated in the direction of arrow A to make a switching operation. Thus, the power section (not shown) is driven so that the seat 1 is moved in the direction of arrow A. When the knob 9 is operated in the direction of arrow B, the bottom-front vertical-movement switching portion 6 is switched so that the front of the bottom 2 is moved vertically by the power section. Further, when the knob 9 is operated in the direction of arrow C, the bottom-rear vertical movement switching section 7 is switched so that the rear of the bottom 2 is moved vertically by the power section.

Another knob 10 is provided so as to correspond to the angle adjustment switching portion 8. The knob 10 is adapted so that the top is movable in the horizontal direction (direction of arrow D) around the bottom. When the knob 10 is moved in the horizontal direction, the angle adjustment switching section 8 is switched so that the angle of the back portion 3 (reclining angle) is adjusted by the power section.

Meanwhile, in the structure described above, since both front and rear of the knob 9 can be movably operated in the vertical direction, while the front of the knob 9 is operated in the direction of arrow B, the rear may be also operated in the direction of arrow C. Otherwise, the center of the knob 9 can be operated in the vertical direction. In this case, the bottom-front vertical movement switching section 6 and the bottom-rear vertical movement switching section 6 may be placed in the switched on state at the same timing. Thus, the two power sections will be driven in a manner superposed in time, which increases a working current.

SUMMARY OF THE INVENTION

This invention has been accomplished under the above circumstance. An object of this invention is to provide a power seat switch apparatus for a motor vehicle in which a plurality of power switching sections are not placed in the switched state at the same timing.

In order to solve the aforesaid object, the invention is characterized by having the following arrangement.

(1) A power seat switch apparatus for a motor vehicle comprising:
a seat horizontal-movement switching portion including a first operated member to be operated in a horizontal direction for moving a seat in the horizontal direction;
a bottom-front vertical-movement switching portion including a second operated member to be operated in a vertical direction for adjusting a bottom-front portion of the seat in the vertical direction;
a bottom-rear vertical movement switching portion including a third operated member to be operated in the vertical direction for adjusting a bottom-rear portion of the seat in the vertical direction;
an angle adjustment switching portion including a fourth operated member to be operated in the horizontal direction for adjusting an angle of a back portion of the seat;
a first knob capable of making a horizontal operation and a vertical operation to operate the seat horizontal-movement switching portion and the bottom-front vertical-movement switching portion; and
a second knob capable of making the horizontal operation and the vertical operation to operate the bottom-rear vertical-movement switching portion and the angle adjustment switching portion.

(2) The power seat switch apparatus according to (1) further comprising an operating member for connecting the first knob to the seat-horizontal-movement switching portion and the bottom-front vertical-movement switching portion.

(3) The power seat switch apparatus according to (2), wherein the operating member includes a knob coupling shaft fitted to the first knob, a first operating protrusion fitted to the second operated member so as to move the second operated member in the vertical direction, and a second operating protrusion fitted to the second operated member so as to move the first operated member in the horizontal direction.

(4) The power seat switch apparatus according to (3), wherein
the operating member, the seat horizontal-movement switching portion and the bottom-front vertical-movement switching portion are accommodated in a base of the seat,
the knob coupling shaft is protruded from a cross-shaped through-hole formed in the base to the outside of the base so as to be fitted in the first knob, and
a supporting shaft protruded from the base is inserted in a sliding-contact hole of the first knob so as to be slidable in the horizontal direction.

In the configuration described above, the first knob operates the seat horizontal movement switching section, which is operated in the horizontal direction to make a switching operation, and the bottom-front vertical movement switching section, which is operated in the vertical direction to make a switching operation. Namely, the first knob does not operate the plural switching sections in the same direction. For this reason, the operation of the first knob will not cause these switching sections to make the switching operation at the same timing. Further, the second knob also operates the bottom-rear vertical movement switching section, which is operated in the vertical direction to make a switching operation, and the angle adjustment switching section, which is operated in the horizontal direction to make a switching operation. For this reason, both switching sections will not make the switching operation at the same timing.

DETAILED DESCRIPTION OF PREFERRED EMBODIMENTS

Figure 1:
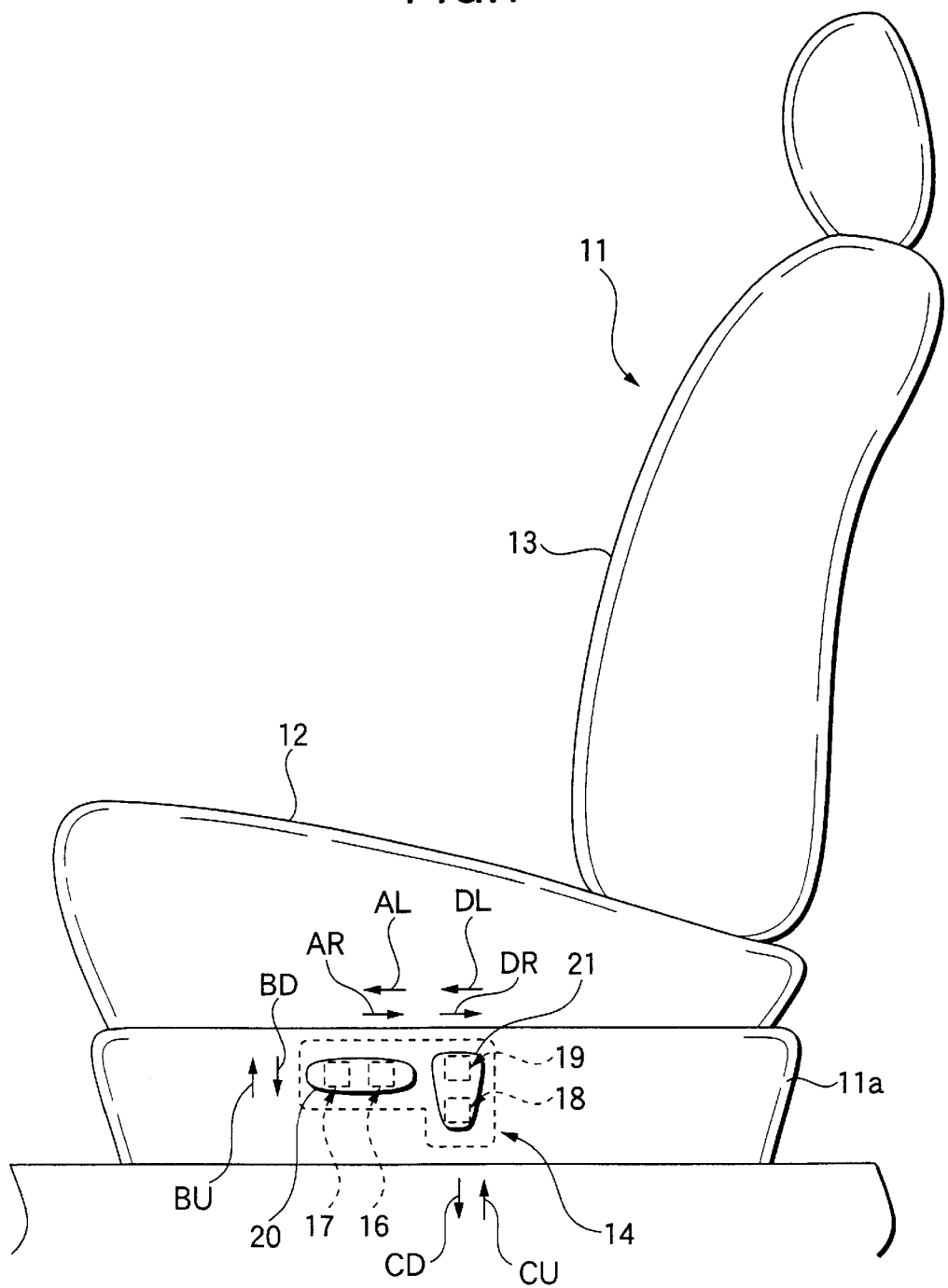
FIG. 1 is a side view of a seat portion which shows an embodiment of this invention.

Now referring to FIGS. 1 to 7, an explanation will be given of an embodiment of this invention. As shown in FIG. 1, a seat 11 is placed on a base 11a, and is constructed by a bottom 12 and a back portion 13. A power seat switch apparatus 4 for changing the form of the seat 1, such as the horizontal position, slope, height of the bottom 12 and angle of the back portion, according to user's preference is attached to the side of the base 1a.

Figure 2:
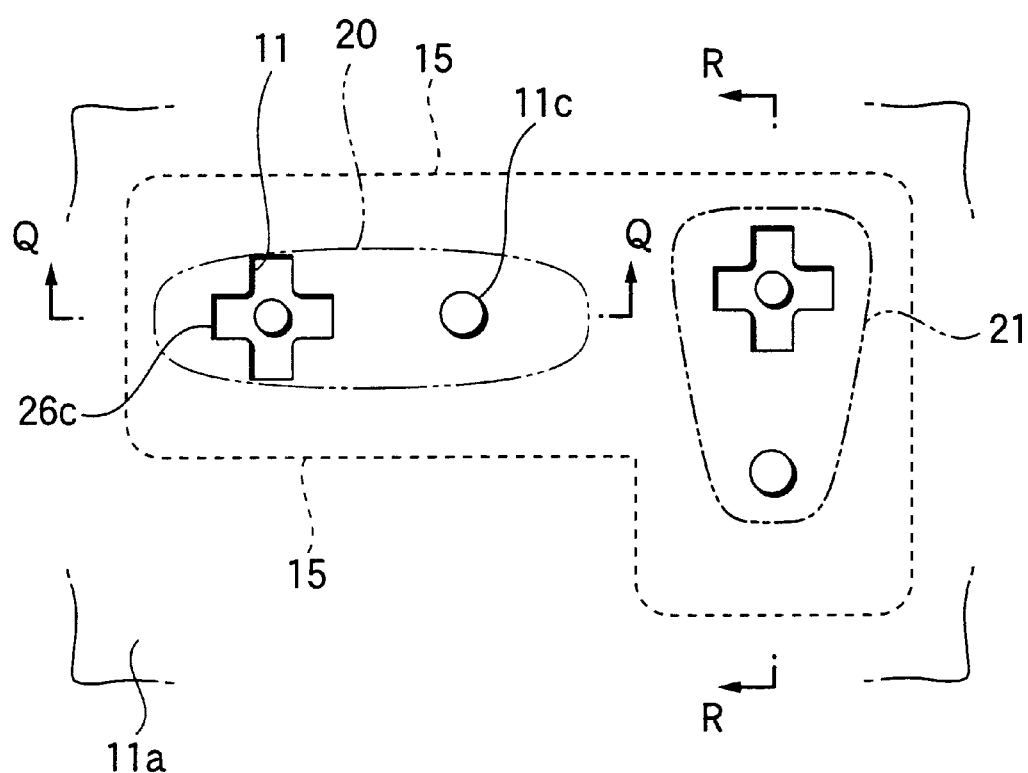
FIG. 2 is a side view of a substantially entire switching device which is illustrated with knobs taken away.
Figure 3:
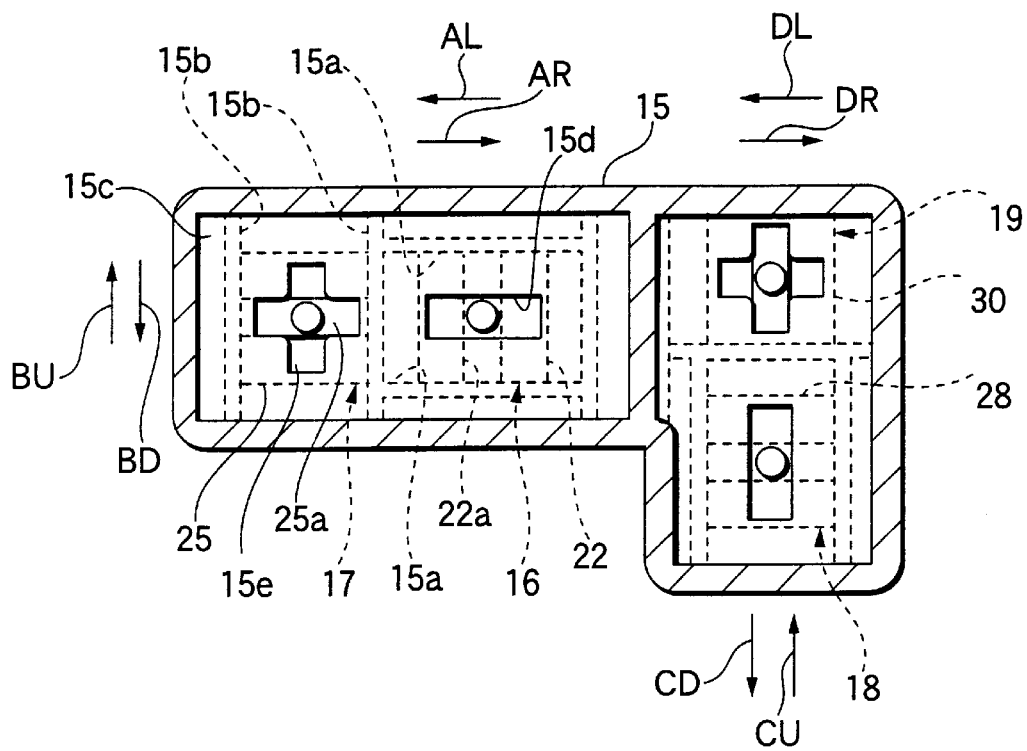
FIG. 3 is a sectional view taken along arrow P in FIG. 4.
Figure 4:
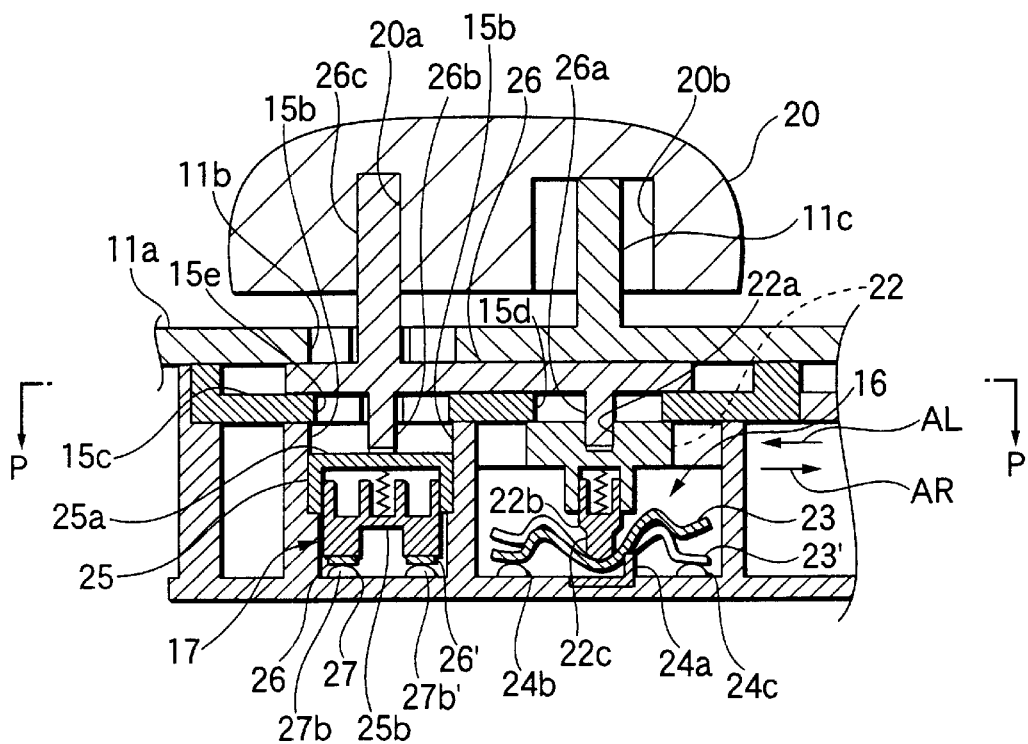
FIG. 4 is a sectional view taken along arrow Q in FIG. 2.

As shown in FIGS. 2 to 4, the power seat switch apparatus 14 is provided with an apparatus case 15. A seat horizontal-movement switching portion 16, a bottom-front vertical-movement switching portion 17, a bottom-rear vertical-movement switching portion 18 and an angle adjustment switching portion 19 are provided to the apparatus case 15. Although described later, the seat horizontal-movement switching portion 16 and the bottom-front vertical-movement switching portion 17 are operated by a first knob 20, and the bottom-rear vertical-movement switching portion 18 and the angle adjustment switching portion 19 are operated by a second knob 21. The configuration including the switching portions 16, 17 and first knob 20 will be described below.

First, the seat horizontal-movement switching portion 16 will be explained with reference to FIGS. 3 and 4. The switching portion 16 includes a first operated member 22, movable contacts 23, 23', and a plurality of fixed contacts 24a, 24b, 24c, 24a', 24b', 24c'. The first operated member 22 is guided by a guiding wall 15a of the apparatus case 15 so that it is movable in the directions of arrows AL and AR in FIG. 3. On the upper surface of the first operated member 22, an engagement groove 22a is formed which extends in a direction (arrows BU, BD) perpendicular to the direction of arrows AL, AR (shown in also FIG. 6). In the lower surface of the operand 22, a pushing piece 22b having two protrusions 22c (only one is shown) is fit together with a spring. The contacts 23, 24a, 24b and 24c constitute a single switch. On the side opposite to the switch, another single switch is symmetrically provided which is composed of the contact 23', 24a', 24b' and 24c'. Therefore, the switching portion 16 is constructed by two single switches.

In the switching section 16, when the first operated member 22 is at the neutral position (state of FIGS. 4 and 5A, shaded portion represents a conducting portion), the contacts 24a, 23 and 24b are in the conducting state and the contacts 24a', 23' and 24c' are also in the conducting state.

Figure 5A:
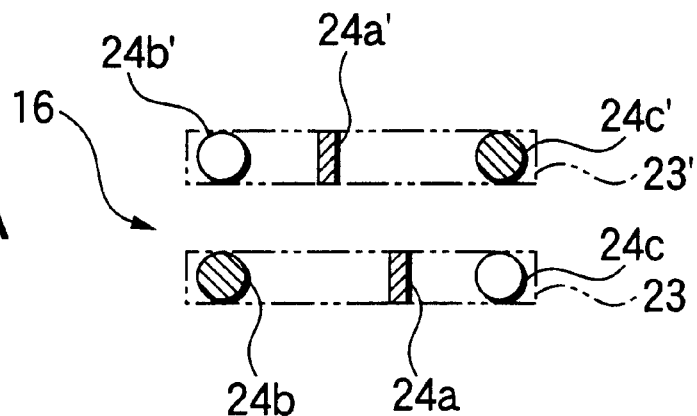
FIGS. 5A to 5C are views showing different contact states of a switching section 16, respectively.
Figure 5B:
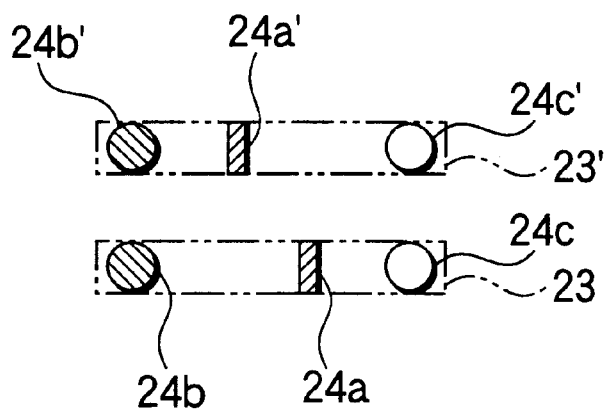

At this time, the power section is a cut-off state. When the first operated member 22 is moved in the direction of arrow AL, the contacts 24a, 23 and 24b stay in the conducting state, and the other contact 24a', 23' and 24b' are switched into the conducting state (FIG. 5B). At this time, the power section is electrically activated so that the motor is rotated in one direction.

Figure 5C:
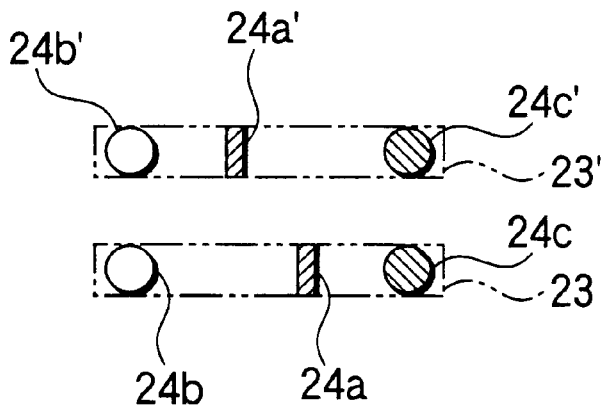
Figure 6:
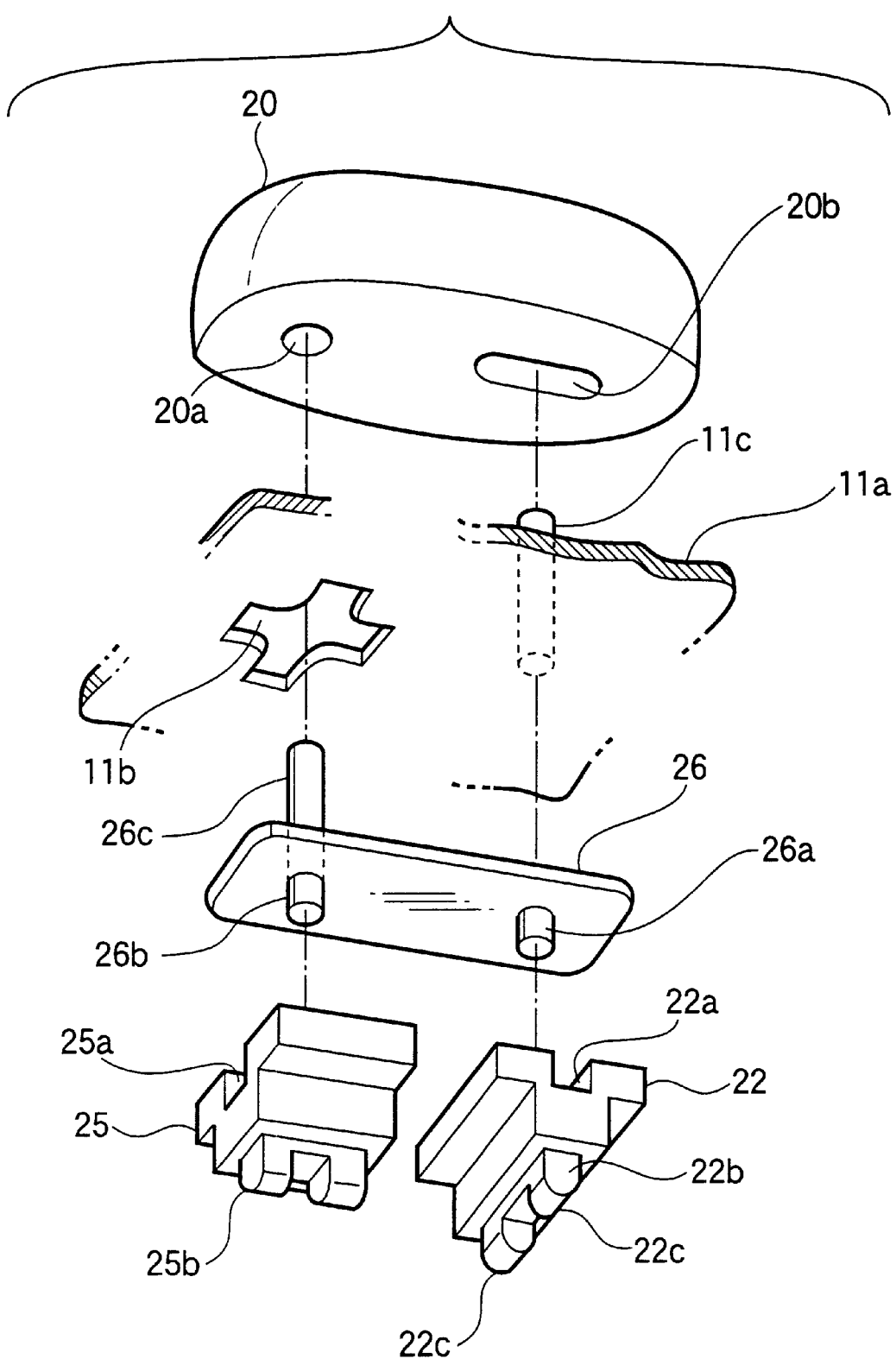
FIG. 6 is an exploded perspective view of a first knob 20, an operator 26, etc.

When the operand 22 is moved in the direction of arrow AR, while the 24a', 23' and 24c' stay in the conducting state, the other contacts 24a, 23, 24c are switched into the conducting state (FIG. 5C). At this time, the power section is electrically activated so that the motor is rotated in an opposite direction.

Next, the bottom-front vertical-movement switching portion 17 will be explained. This switch 17 basically has the same configuration as the switching section 16, and has a second operated member 25, movable contacts 26, 26' and six fixed contacts (two contacts 27b, 27b' corresponding to the contacts 24b, 24b' are shown in FIG. 4). The second operated member 25 is guided by guiding walls 15b, 15b so that it is arranged movably in the direction of arrows BU and BD in FIG. 4. On the upper surface of the second operated member 25, an engagement groove 25a is formed which extends in a direction (arrows AL, AR) perpendicular to the direction of arrows BU, BD. In the lower surface of the second operated member 25, a pushing piece 25b similar to the pushing piece 22b is fit together with a spring.

In the switching portion 17, when the second operated member 25 is moved in the direction of arrow BU from the neutral position (see FIG. 1), the respective contacts operate in the same manner as in the switching portion 16. At this time, the power section is electrically activated so that the motor is rotated in one direction. When the second operated member 25 is moved in the direction of arrow BD, the power section is electrically activated so that the motor is rotated in an opposite direction.

On the upper plate 15c of the device case 15, an operating protrusion arranging hole 15 is formed along arrows AL and AR so as to the first operand 22 of the switching section 16. A cross-shaped operating protrusion arranging hole 15e is also formed so as to correspond to the second operand 25 of the switching section 17.

On the upper plate 15c of the apparatus case 15, an operating member 26 for operating the first and second operated members of the respective switches 16 and 17 are arranged. On the one surface of the operating member 26 (lower face of FIG. 2), operating protrusions 26a and 26b are formed. The one operating protrusion 26a is fit in the engagement groove 22a of the first operated member 22 through the above operating protrusion arranging hole 15d. The other operating protrusion 26b is fit in the engagement groove 25a of the second operated member 25 through the operating protrusion arranging hole 15e. A knob coupling shaft 26c is protruded from the other surface of the operating member 26 (upper face of FIGS. 2 and 4). The knob coupling shaft 26c is protruded from a cross-shaped through-hole 11b formed in the base 11a to the outside of the base 11a. A supporting shaft 11c is protruded from the outer surface of the base 11a.

The first knob 20 has a generally slightly rectangular shape. On the rear face thereof, a fitting hole 20a and a rectangular sliding-contact hole 20b are formed. The knob coupling shaft 26c is fit in the fitting hole 20a in a pressed state. The supporting shaft 11c is movably inserted in the sliding-contact hole 20b.

Thus, when the first knob 20 is operated in the direction of arrow AL, the switching portion 16 makes a contact operation in one form as described above so that the motor of the power section not shown is rotationally driven in the one direction to move the seat 11 in the direction of arrow AL. Inversely, when the first knob 20 is operated in the direction of arrow AR, the switching portion 16 makes a contact operation in the other form so that the motor of the power section not shown is rotationally driven in the opposite direction to move the seat 11 in the direction of arrow AR.

Further, when the first knob 20 is moved in the direction of arrow BU, the switching portion 17 makes the contact operation in the one form so that the motor of the power section is rotationally driven in the one direction to move the front of the seat 12 in the direction of arrow BU. Inversely, when the first knob 20 is moved in the direction of arrow BD, the switching portion 17 makes the contact operation in the other form so that the motor of the power section is rotationally driven in the other direction to move the front of the seat 12 in the direction of arrow BD.

Figure 7:
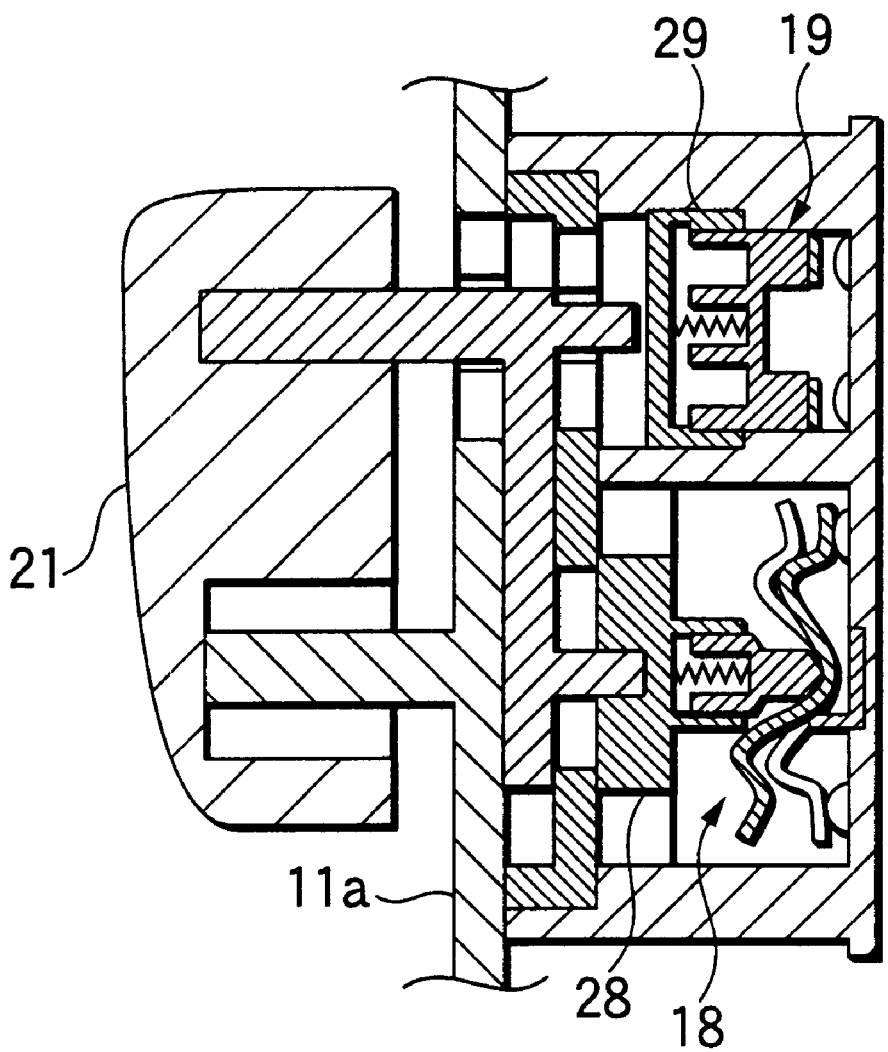
FIG. 7 is a sectional view along arrow R in FIG. 2.
Figure 8:
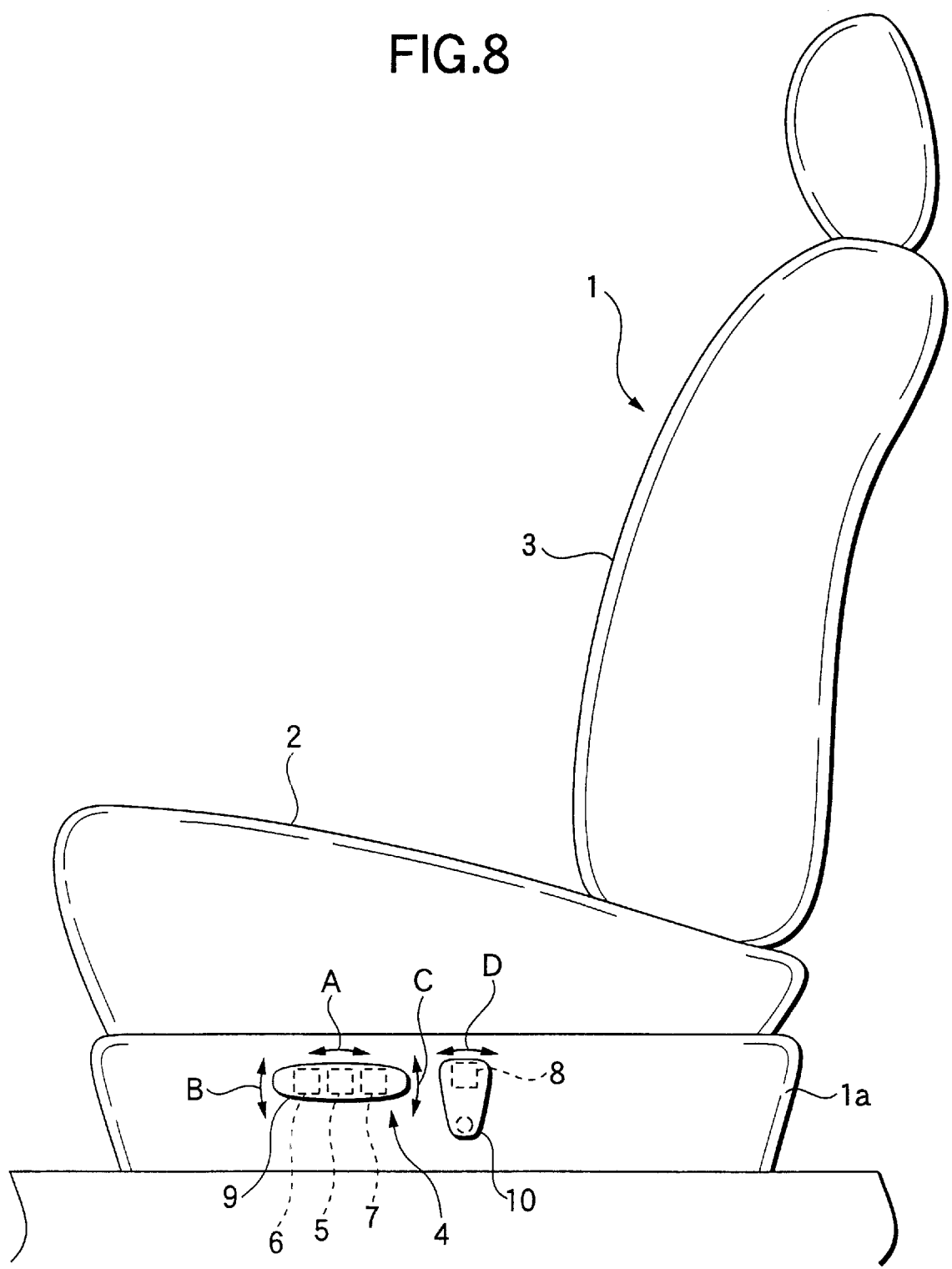
FIG. 8 is a view of a prior art corresponding to FIG. 1.

On the other hand, the configuration including switches 18, 19 and second knob 21 is shown in FIG. 7. This configuration is basically the same as that including the switching portions 16, 17 and first knob 20. The switching portion 18 includes a third operated member 28 and a plurality of contacts similar to those in the switching portion 16. The switching portion 19 includes a fourth operated member 29 and a plurality of contacts similar to those in the switching portion 17.

In the configuration described above, when the second knob 21 is moved in the direction of arrow CU, the switching portion 18 makes the contact operation in the one form so that the motor of the power section not shown is rotationally driven in the one direction to move the back portion 13 of the seat 12 in the direction of arrow CU. Inversely, when the second knob 21 is moved in the direction of arrow CD, the rear of the seat 12 is moved in the direction of arrow CD (opposite to the direction of arrow CU). Further, when the second knob 21 is moved in the direction of arrow DL, the switching portion 19 makes the contact operation in the one form so that the motor of the power section not shown is rotationally driven in the one direction to move the back portion 13 in the direction of arrow DL. Inversely, when the second knob 21 is moved in the direction of arrow DR, the back portion 13 is moved in the direction of arrow DR.

In this way, in accordance with this embodiment, the first knob 20 operates the seat horizontal-movement switching portion 16, which is operated in the horizontal direction to make a switching operation, and the bottom-front vertical-movement switching portion 17, which is operated in the vertical direction to make a switching operation. Namely, the first knob 20 does not operate the plurality of switching portions (e.g. switching portions 17 and 18) in the same direction. Therefore, the operation of the first knob 20 will not cause the switching sections 16 and 17 to make the switching operation at the same timing. Further, the second knob 21 operates the bottom-rear vertical-movement switching portion 18, which is operated in the vertical direction to make a switching operation, and the angle adjustment switching portion 19, which is operated in the horizontal direction to make a switching operation. Therefore, both switching portions 18 and 19 will not make the switching operation at the same timing. In addition, the switching portion 16 and the switching portion 18 or 19 will not make the switching operation at the same timing, and the switching section 17 and the switching section 18 or 19 will not make the switching operation at the same timing.

As understood from the explanation hitherto made, this invention can provide a power seat switch apparatus for a motor vehicle in which a plurality of switching section are not fallen in the switching-operated state at the same timing.

What is claimed is:

1. A power seat switch apparatus for a motor vehicle comprising:

a seat horizontal-movement switching portion including a first operated member to be operated in a horizontal direction for moving a seat in the horizontal direction;

a bottom-front vertical-movement switching portion including a second operated member to be operated in a vertical direction for adjusting a bottom-front portion of the seat in the vertical direction;

a bottom-rear vertical movement switching portion including a third operated member to be operated in the vertical direction for adjusting a bottom-rear portion of the seat in the vertical direction;

an angle adjustment switching portion including a fourth operated member to be operated in the horizontal direction for adjusting an angle of a back portion of the seat;

a first knob capable of making a horizontal operation and a vertical operation to operate the seat horizontal-movement switching portion and the bottom-front vertical-movement switching portion; and a second knob capable of making the horizontal operation and the vertical operation to operate the bottom-rear vertical-movement switching portion and the angle adjustment switching portion.

2. The power seat switch apparatus according to claim 1 further comprising an operating member for connecting the first knob to the seat-horizontal-movement switching portion and the bottom-front vertical-movement switching portion.

3. The power seat switch apparatus according to claim 2, wherein the operating member includes a knob coupling shaft fitted to the first knob, a first operating protrusion fitted to the second operated member so as to move the second operated member in the vertical direction, and a second operating protrusion fitted to the second operated member so as to move the first operated member in the horizontal direction.

4. The power seat switch apparatus according to claim 3, wherein the operating member, the seat horizontal-movement switching portion and the bottom-front vertical-movement switching portion are accommodated in a base of the seat, the knob coupling shaft is protruded from a cross-shaped through-hole formed in the base to the outside of the base so as to be fitted in the first knob, and a supporting shaft protruded from the base is inserted in a sliding-contact hole of the first knob so as to be slidable in the horizontal direction.

* * * * *